July 9, 1957  L. D. THOMAS  2,799,014
MONITOR SYSTEM
Filed Aug. 17, 1955
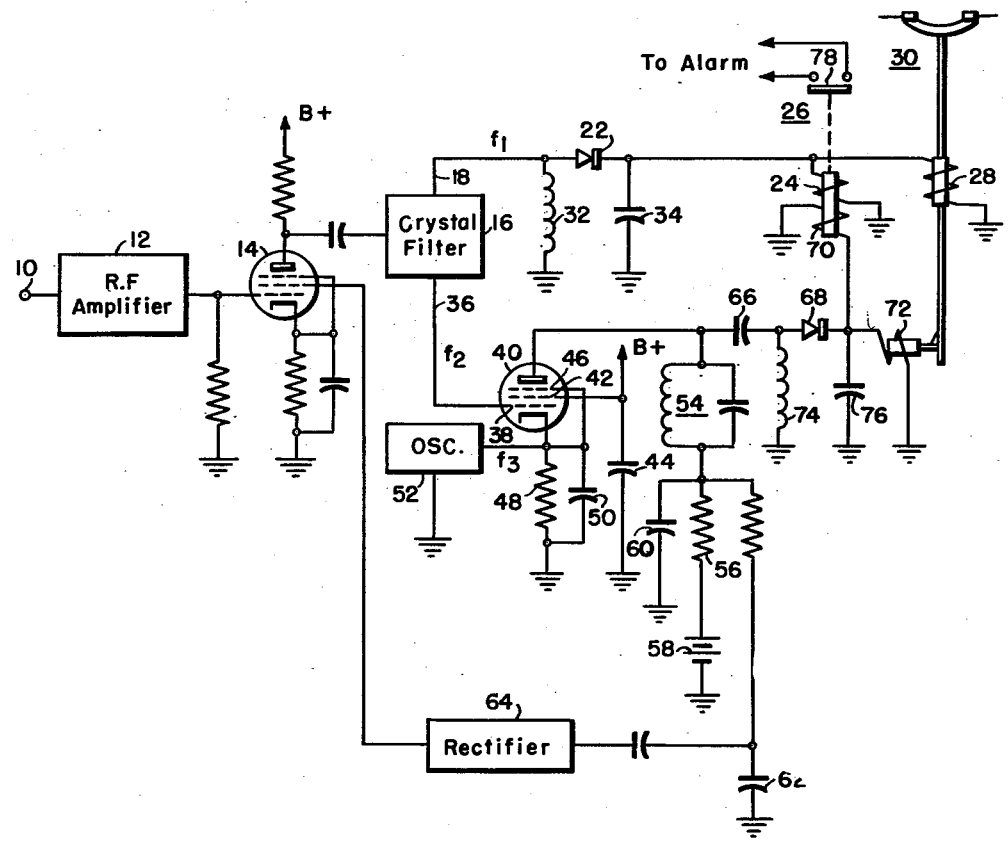
WITNESSES
INVENTOR
Leslie D. Thomas
BY
ATTORNEY

United States Patent Office 2,799,014
Patented July 9, 1957

2,799,014

MONITOR SYSTEM

Leslie D. Thomas, Arbutus, Md., assignor to Westinghouse Electric Corporation, East Pittsburgh, Pa., a corporation of Pennsylvania Application August 17, 1955, Serial No. 529,046

7 Claims. (Cl. 340—253)

This invention relates to monitor systems for protective relaying apparatus and more particularly to a monitor system which is impervious to false operation by failure of any of the components of the monitor system itself.

Protective relaying installations require transmitters and receivers with a very high order of dependability in which it is almost impossible for failure of any component to cause false tripping, and in which any tube failure will cause the operation of an alarm as soon as it occurs. A method heretofore used to provide the required freedom from false tripping due to tube failure was to operate the protective relay from the rectified output of an amplifier, the input of which was either radio frequency energy from a discriminator or audio frequency energy from a detector. When this method is employed, the required freedom from false tripping due to tube failure is obtained; but failure of the amplifier tube itself cannot be easily detected and causes the circuit to fail to trip when required.

Emission of the tube may be monitored by a plate current relay and certain internal tube shorts may also be detected by the same means. This method, however, has the following drawbacks: (1) A special plate relay is required; and if it is desired to detect short circuits, this relay must be of a differential type; and (2) certain tube shorts produce little or no change in plate current and are, therefore, almost impossible to detect by the means described above.

Even though the possibility of false tripping due to tube failure is eliminated in a monitor system, there is always the possibility of failure of components in the system other than the tube which may cause false tripping. The output of the aforesaid amplifier in a monitor system is coupled through a capacitor to a rectifier, the output of which operates a protective relay. In prior circuits of which I am aware, breakdown of this capacitor could cause false tripping.

It is an object of my invention to provide a monitor system for protective relaying apparatus in which failure of any of the components of the monitor system itself will not cause false tripping of the relaying apparatus.

It is another object of my invention to provide a monitor circuit for an amplifier tube which uses a single conventional direct current relay to detect internal shorts or other faults within the tube itself.

A still further object of my invention lies in the provision, in protective relaying apparatus which utilizes a continuous frequency-shift signal, of means for indicating either the absence of said continuous signal or failure of the amplifier tube of the monitor system for the apparatus.

In accordance with my invention, hereinafter described, I provide an amplifier tube operated under class A, or near class A, conditions. In addition to an R. F. or audio input signal applied to the tube, I also apply a small monitor signal. The plate current of the tube will then contain alternating current components corresponding to both the monitor input and the R. F. or audio input. Providing the frequencies differ by a large amount in the output of the tube, they may be separated by a simple resistance-capacity filter network. The separated R. F. or audio component is then rectified and applied to a protective relay while the separated monitor signal is rectified to produce a direct current output as long as the amplifier tube is in working condition. In the event of failure of the tube, the direct current monitor output is cut off. This output may be applied in any desired way to operate an alarm which thus indicates failure of the tube. By choosing circuit constants in the output circuit of the amplifier in a manner hereinafter described, false tripping due to breakdown of the coupling capacitor between the aforesaid filter network and the protective relay can be prevented.

Further objects and features of the invention will become apparent from the following detailed description taken in connection with the accompanying single figure drawing which illustrates the invention in block and schematic circuit form.

Referring to the drawing, a continuous frequency shift signal is applied to input terminal 10 of R. F. amplifier 12. As is well known to those skilled in the art, a continuous frequency shift signal used for monitoring purposes shifts between two predetermined frequencies which, for purposes of explanation, will be designated by $f_1$ and $f_2$. If it is assumed that the monitor system is used to operate a circuit breaker in a transmission line, the signal of frequency $f_1$ will be applied to amplifier 12 under normal operating conditions. If a fault should occur in the transmission line, the continuous signal will shift to frequency $f_2$, thereby causing the circuit breaker to trip and open the transmission line. In any case the signal will be at either frequency $f_1$ or frequency $f_2$ at any one time.

The output of amplifier 12 is applied through limiter 14 to the input of a crystal filter 16 which separates the signal of frequency $f_1$ from that of frequency $f_2$. The signal of frequency $f_1$ is applied through lead 18 to rectifier 22; and the resulting rectified output is passed through one energizing winding 24 of alarm relay 26 and the closing or hold coil 28 of circuit breaker 30. Choke coil 32 provides a return path for the direct current passing through rectifier 22, and capacitor 34 serves to bypass to ground any alternating current components of the direct current signal passing through rectifier 22.

The signal of frequency $f_2$ is applied through lead 36 to the control grid 38 of a pentode amplifier 40. Screen grid 42 of pentode 40 is connected to the positive terminal of an anode voltage source (indicated by B+) and to ground through capacitor 44. Suppressor grid 46 is connected to the cathode of pentode 40 as shown. The cathode is connected to ground through cathode resistor 48 and bypass capacitor 50. A third monitoring signal of frequency $f_3$ is applied from oscillation source 52 across resistor 48 and capacitor 50. The ratio of frequency $f_3$ to frequency $f_2$ should be approximately 1 to 100 so that these two frequencies may be conveniently separated in the output circuit of pentode 40 by a simple resistance-capacitance filter network. Source 52 is shown in block form in the drawing; however, in an actual installation the monitor signal may be conveniently obtained from the 60-cycle heater supply for pentode 40 in alternating current-operated equipment, or from a simple relaxation oscillator in direct current-operated equipment.

The plate circuit of pentode 40 includes a parallel resonant circuit 54 tuned to frequency $f_2$, a resistor 56 and an anode voltage supply, such as battery 58. Capacitors 60 and 62 serve to bypass frequencies above $f_3$ to ground. The signal of frequency $f_3$ which passes through the tank circuit 54 is applied to a rectifier 64, and the resulting rectified output is then applied with a positive polarity to the screen grid of limiter 14.

Signals of frequency $f_2$ will not pass through tank circuit 54 since it presents a high impedance to these signals. The signal component of frequency $f_2$ appearing in the output of pentode 40 will, therefore, pass through capacitor 66 and rectifier 68. The rectified output is then passed through a second energizing winding 70 for alarm relay 26 and a trip coil 72 for circuit breaker 30. As was the case with rectifier 22, choke coil 74 provides a return path for the direct current passing through rectifier 68, whereas capacitor 76 serves to bypass any alternating current component in the rectified output of rectifier 68.

In the event of a breakdown of the coupling capacitor 66, a positive voltage will appear across rectifier 68 and will cause current to pass through energizing windings 70 and 72. However, by suitably selecting the values of resistance 56 and the direct current resistance of the choke 74, it is possible to reduce this current to a point where it will not actuate the relays.

If the direct current resistance of resistor 56, tank circuit 54, and choke coil 74 are $R_{56}$, $R_{54}$ and $R_{74}$, respectively, and if capacitor 66 should become shorted, then the direct current voltage across rectifier 68 plus relay coils 70 and 72 in parallel will be approximately $$\frac{R_{74}}{R_{56}+R_{54}+R_{74}} \times V$$

where V is the voltage supplied by battery 58. If the resistance of rectifier 68 together with coils 70 and 72 in parallel is represented by $R_c$, then the relay current during a short circuit of capacitor 66 is approximately $$\frac{V}{R_c} \times \frac{R_{74}}{R_{56}+R_{54}+R_{74}}$$

The circuit may be designed so that $R_{56}$ is equal to 10,000 ohms, the resistance $R_{54}$ of tank circuit 54 is about 50 ohms, the resistance $R_{74}$ of choke coil 74 is 90 ohms, and the resistance $R_c$ of windings 70 and 72 in parallel together with the resistance of rectifier 68 is 3,500 ohms. The voltage of battery 58 will be assumed to be 250 volts, and the relay current required for tripping is 5 milliamperes.

In the event of a short circuit in capacitor 66 the relay current would be $$\frac{250}{3500} \times \frac{90}{10,000+50+90}$$

amps, or approximately 0.6 milliampere. This is insufficient current to cause coil 72 to trip. In actual practice the current would probably be less than this because of the regulation resistance of battery 58. Consequently, the circuit will produce a false trip only in the event of simultaneous failure of both capacitor 66 and choke coil 74. However, if coil 74 is capable of carrying the maximum current developed by battery 58, this failure is extremely improbable.

Under normal conditions a signal of frequency $f_1$ will be received by the monitor system. Hence, the rectified output from rectifier 22 will pass through energizing coil 24 to energize the same and keep contacts 78 of relay 26 open. In addition, the direct current passing through winding 28 will maintain the circuit breaker 30 in its closed or normal position. During this time the monitor signal of frequency $f_3$ will appear in the output circuit of pentode 40 and will pass through tank circuit 54 to rectifier 64. The output of rectifier 64 is then applied with a positive polarity to the screen grid of pentode 14 to maintain the same conductive. If a fault should occur, the frequency of the signal applied to the amplifier 12 will shift to frequency $f_2$. The plate current of pentode 40 will now contain an alternating component of frequency $f_2$ and another component of frequency $f_3$. The monitor signal of frequency $f_3$ will still pass through tank circuit 54 and will be rectified in rectifier 64 to maintain a positive bias on the screen grid of limiter 14. Also, the signal of frequency $f_2$ will be rectified by rectifier 68 and will pass through winding 70 of relay 26 to hold contacts 78 is open position while the current passing through coil 72 will trip the circuit breaker 30 and open the transmission line. When the fault is removed, the signal of frequency $f_1$ will again be received and will energize closing coil 28 to close the circuit breaker. It can be seen that when either a signal of frequency $f_1$ or a signal of frequency $f_2$ is received by the system, the contacts 78 of relay 26 will be open since both energizing windings 24 and 70 are wound to open the contacts. If there is a complete absence of a received signal due to failure of the signal source itself or failure of any components in the R. F. strip, contacts 78 will close thereby actuating alarm circuitry, not shown. Also, if amplifier tube 40 should fail, the signal of frequency $f_3$ will not pass through the pentode 40 and the positive bias on the screen grid of limiter 14 will disappear. Consequently, the limiter will not pass signals and relay 26 will become deenergized to actuate the aforesaid alarm circuitry.

Although the direct current resulting from the signal of frequency $f_3$ is used in the present embodiment of the invention to control the bias on the screen grid of limiter 14, it may be used in an obvious manner to actuate a separate alarm distinct from the alarm controlled by relay 26.

The monitor input to the pentode 40, being of a lower frequency than frequency $f_2$, will modulate the output of the pentode and will, therefore, cause an alternating current component to appear in the current passing through winding 70 and coil 72. By operating the pentode under class A conditions and by keeping the monitor frequency as low as possible, this effect may be minimized so that the alternating current component of the relay current is not objectionable.

Although I have described my invention in connection with a specific embodiment, it will be apparent to those skilled in the art that various changes in form and arrangement of parts can be made to suit requirements without departing from the spirit and scope of the invention.

I claim as my invention:

1. In combination with a source of high frequency signals, an amplifier tube for said signals, an anode and cathode for said tube, a source of anode voltage for said tube having its negative terminal connected to a point of reference potential, an impedance element connecting the cathode of said tube to said point of reference potential, means for applying a signal of a frequency lower than the frequency of said high frequency signal source across said impedance element, a plate circuit for said tube connecting said anode to the positive terminal of said anode voltage supply, a parallel resonant circuit included in said plate circuit, said parallel resonant circuit being tuned to the frequency of said high frequency signal source, rectifying means connected in shunt relationship with respect to said parallel resonant circuit, means for rectifying alternating currents passing through said parallel resonant circuit, and an electron valve controllable by the rectified output of said last-mentioned means for controlling said source of high frequency signals.

2. In combination, a first source of signals having one frequency, a second source of signals having another frequency which is lower than said one frequency, means for combining signals of said one frequency with signals of said other frequency, a filter network connected to the output of said combining means for separating signals of said one frequency from signals of said other frequency, means for rectifying the separated signals of said one frequency, and an electron valve device responsive to the separated signals of said other frequency for controlling said first signal source.

3. In combination with a continuous signal which shifts between two predetermined frequencies $f_1$ and $f_2$, a filter network for separating said different frequency signals, means for rectifying signals of frequency $f_1$ to produce a first direct current voltage, a source of signals having a frequency $f_3$ lower than either of said predetermined frequencies, means for combining signals of frequency $f_2$ with signals of frequency $f_3$, means for amplifying the combined signal, a filter network connected to the output of said amplifying means for separating signals of frequency $f_2$ from signals of frequency $f_3$, means for rectifying the separated signal of frequency $f_2$ to produce a second direct current voltage, a device responsive to said first and second direct current voltages for indicating an absence of said continuous signal, means for rectifying the separated signal of frequency $f_3$ to produce a third direct current voltage, and means responsive to said third direct current voltage for controlling said continuous signal.

4. In combination with a first high frequency signal source and a second source of signals having a frequency lower than said high frequency signal source, an electron tube for amplifying signals from said first signal source, grid and plate circuits for said tube, at least one impedance element included in said grid circuit, means for applying said second source of signals across said impedance element, a parallel resonant circuit included in said plate circuit, said resonant circuit being tuned to the frequency of said high frequency signal source, an electron valve device responsive to signals passing through said resonant circuit for cutting off said high frequency signal source in the absence of signals of said lower frequency in said plate circuit, and means connected in shunt relationship with said resonant circuit for rectifying signals of said high frequency appearing in said plate circuit.

5. In combination with a first source of signals of frequency $f_1$ and a second source of signals of frequency $f_2$, a device for amplifying signals of frequency $f_1$, means for applying signals of frequency $f_2$ to said amplifying device whereby the output of said amplifying device will contain a component of frequency $f_1$ and a component of frequency $f_2$, means for separating said different-frequency components in the output of said amplifying device, and an electron valve device for cutting off said source of signals of frequency $f_1$ in response to the absence of signals of frequency $f_2$ from said separating means.

6. In combination, a first source of signals which shifts between two predetermined frequencies $f_1$ and $f_2$, means for separating signals of frequency $f_1$ from signals of frequency $f_2$, a source of signals of frequency $f_3$, means for combining separated signals of frequency $f_2$ with a signal from said source of frequency $f_3$, a filter network connected to the output of said combining means for separating signals of frequency $f_2$ from the signal of frequency $f_3$, and means responsive to the separated signal of frequency $f_3$ for controlling said first source of signals.

7. The combination claimed in claim 6 and including an alarm device responsive to the separated signals of frequencies $f_1$ and $f_2$ for indicating a simultaneous absence of both of said signals.

References Cited in the file of this patent
UNITED STATES PATENTS

| | | |
|---|---|---|
| 2,561,357 | Garfield | July 24, 1951 |
| 2,703,877 | Stoff et al. | Mar. 8, 1955 |